Feb. 11, 1941.  L. P. TINKHAM  2,231,143
DASH LIGHT
Filed Oct. 10, 1938
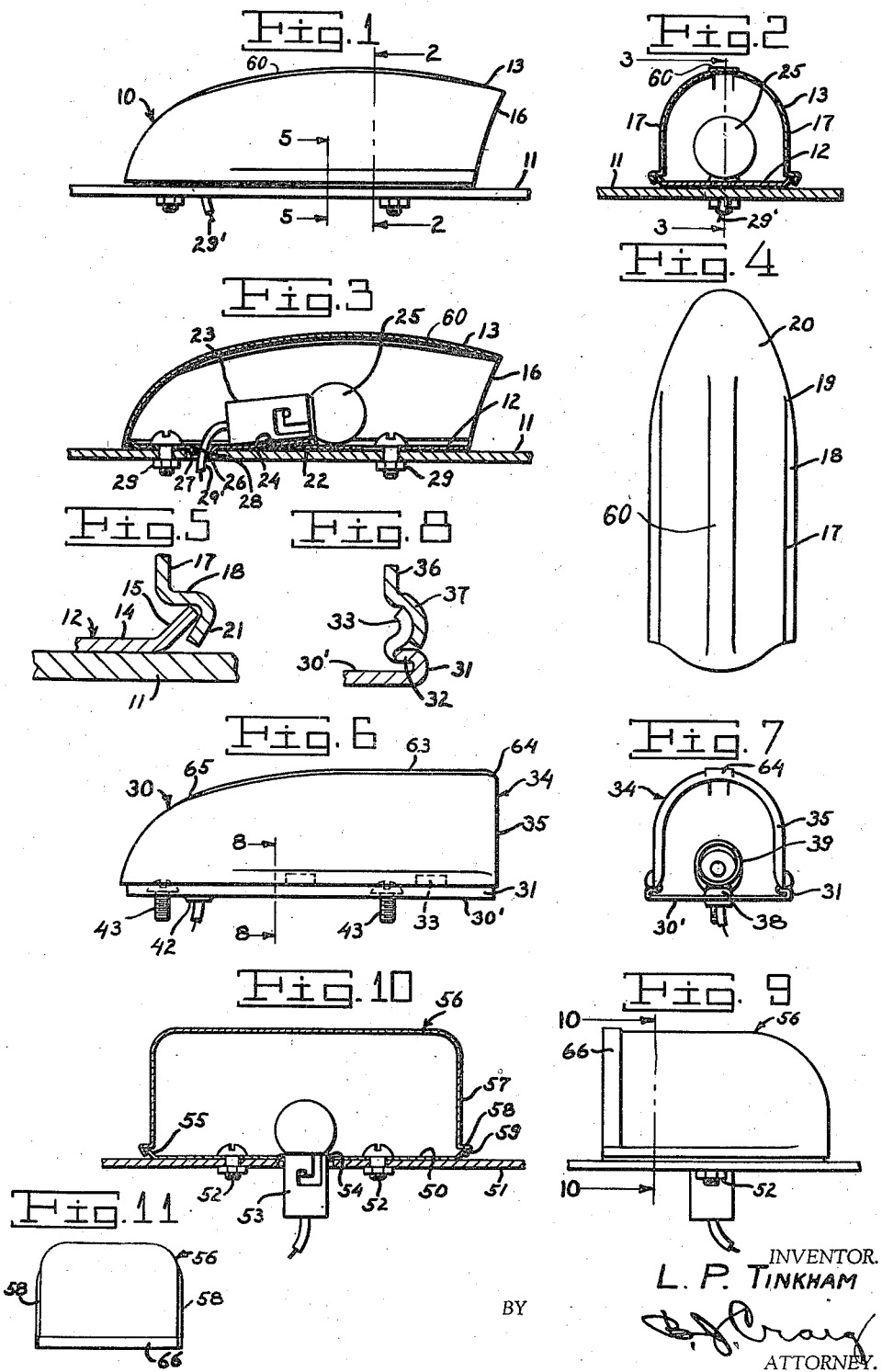
INVENTOR.
L. P. TINKHAM
BY
ATTORNEY.

Patented Feb. 11, 1941

2,231,143

UNITED STATES PATENT OFFICE 2,231,143

DASH LIGHT

Leland P. Tinkham, Pasadena, Calif.

Application October 10, 1938, Serial No. 234,193

2 Claims. (Cl. 240—8.16)

This invention relates to vehicle lights.

The general object of the invention is to provide an improved vehicle dash light.

A more specific object of the invention is to provide a novel vehicle dash light including a novel removable cover.

Another object of the invention is to provide a dash light including a novel base having a cover secured thereon.

Another object is to provide an improved means for removably and adjustably mounting the cover of a dash light in place.

Other objects and the advantages of my invention will be apparent from the following description taken in connection with the accompanying drawing, wherein:

Fig. 1 is a side elevation showing a dash light embodying the features of my invention;

Fig. 2 is a section taken on line 2—2 Fig. 1;

Fig. 3 is a section taken on line 3—3 Fig. 2;

Fig. 4 is a top plan view of the dash light;

Fig. 5 is an enlarged detail section taken on line 5—5 Fig. 1;

Fig. 6 is a side elevation showing a modification;

Fig. 7 is an end view of the modification shown in Fig. 6;

Fig. 8 is an enlarged detail section taken on line 8—8 Fig. 6;

Fig. 9 is a side elevation showing a further modification;

Fig. 10 is a section taken on line 10—10 Fig. 9; and

Fig. 11 is an end plan view of the further modification.

Referring to the drawing by reference characters I have shown my invention as embodied in a dash light which is indicated generally at 10. As shown the dash light is indicated as mounted on an instrument panel 11 and includes a base 12 and a cover 13, both of which are preferably made of metal. The base 12 preferably includes a bottom portion 14 having side edges which are inclined upwardly as at 15 to provide securing flanges (see Fig. 5). The forward end of the base is curved to conform to the shape of the cover 13 and the flanges 15 gradually vanish in the curved forward portion. The cover 13 is preferably arched in both transverse and longitudinal section while the rear edge 16 is curved to provide an overhand as shown in Figs. 1 and 3.

The parallel sides 17 of the cover have an outwardly directed flange 18 along each side which vanishes at 19 in the rounded forward portion 20 (see Fig. 4). Each of the flanges 18 has an integral downwardly and inwardly bent flange portion 21 thereon. The flange 18 slidably engages the top edge of the flange 15, while the portion 21 engages the lower outer edge of the flange 15 so that the parts are held in assembled position by friction and by the resiliency of the cover 13.

The base 12 is provided with an upstruck projecting panel portion 22 located intermediate its length. The upper surface of this panel portion 22 is inclined and receives a lamp socket 23 which is held in place as by a spot weld 24. The panel being inclined permits the introduction of a lamp bulb 25 without interference with the bottom 14. The bottom 14 includes an aperture 26 at the lower end of the panel. The aperture 26 is surrounded by a flange 27 which extends downwardly into an aperture 28 in the panel 11. Bolts 29 pass through apertures in the bottom 14 and through the panel 11 to hold the light in place.

In assembly the required holes are drilled in the instrument panel 11 after which the base 12 is secured by the bolts 29. The lead wire 29' is then extended through the aperture 26 and is suitably connected to the vehicle wiring. The bulb 25 is then inserted. The next operation is to place the cover 13 with its edge grooves fitting the edges 15 of the base after which the cover is slid to the desired position. The resiliency and friction of the metal firmly holds the cover in place yet allows it to be shifted when more light is desired.

In Figs. 6, 7 and 8 I show a modification of my invention at 30 wherein the base 30' is provided with an edge portion which includes an upstanding part 31 (see Fig. 8) from which an inwardly directed portion 32 extends. This portion 32 is preferably parallel to the base 30' and at spaced intervals (shown as two in number at each side) is provided with opposed short, upwardly directed, resilient, curved tongues 33.

In the modification the cover 34 is provided with a straight end edge 35 and along the bottom thereof the side 36 has arcuate beads 37 (Fig. 8) which slidably engage the tongues 33. The resiliency of the parts is such that the cover may be snapped in place and held in adjusted position. The bottom 30' is provided with a panel 38 similar to the panel 22 and this supports a lamp socket 39 which is held in place, as by welding. The socket 39 is adapted to hold a bulb in the same manner in which the socket 23 holds the bulb 25. The base 30' is provided with an aperture similar to the aperture 26 about which a flange 42 extends. Bolts 43 are employed in holding the modification on the instrument panel.

In Figs. 9, 10 and 11 I show a further modification of my invention wherein a base 50 is held on the instrument panel 51 as by screws 52. The base 50 is provided with a lamp socket 53 which projects therethrough and is held in place as by spot welding at 54. The bottom 50 is provided with an angularly disposed edge portion 55 similar to the edge flange 15 previously described.

In the further modification the cover 56 is provided with sides 57 which include an outwardly directed edge flange 58 similar to the flange 18 and a downwardly and inwardly bent flange portion 59 similar to the flange 21. The flanges 58 and 59 engage the edge portions 55 similar to the manner in which the flanges 18 and 21 engage the edge flanges 15.

The dash light 10 is shown as provided in the top portion with a stiffening bead 60 which in the lamp 10 relatively is deep at the middle portion and which vanishes at the ends.

In the light 30 a bead 63 merges at the end 35 into a rounded edge portion 64 and at the other end vanishes as at 65.

The light shown in Figs. 9, 10 and 11 includes an end stiffening end bead 66 which merges into the flanges 58.

From the foregoing description it will be apparent that I have invented a novel dash light which can be economically manufactured and readily installed and which is highly efficient for the intended purpose.

Having thus described my invention I claim:

1. In a dash light, a base, said base having upwardly inclined parallel side flanges and having a curved end portion, said side flanges vanishing at the curved portion, a cover on said base, means for slidably mounting the cover on said base to control the light emitted therefrom, said cover having a curved end portion and an opposite open end portion and including parallel sides, said slidable mounting means including outwardly directed flanges on the parallel sides adapted to engage the upper edges of the base side flanges, said outwardly directed flanges on the cover having downwardly and inwardly directed flanges thereon engaging the lower edges of said base side flanges, said cover flanges vanishing at the curved portions thereof, said base having an indented, integral, inclined panel thereon adapted to support a lamp socket.

2. In a dash light, a base, said base having an upwardly inclined edge flange at each side thereof, said flanges being parallel, the forward end portion of said base being curved, said flanges vanishing at the curved end portion, a cover on said base, means for slidably mounting the cover on said base to control the light emitted therefrom, said cover including parallel sides and a curved end portion, said cover having an open end portion opposite the curved end portion, said slidable mounting means including outwardly directed flanges on the parallel sides and engaging the upper edges of the base flanges, said outwardly directed flanges on the cover having downwardly and inwardly directed flanges thereon engaging the lower edge of said base flanges, said cover flanges vanishing at the curved end portion of the cover, said base having an indented, integral, inclined panel thereon adapted to support a lamp socket, said base having an aperture with a centering flange thereabout, said cover having a stiffening bead thereon which vanishes at the curved end portion.

LELAND P. TINKHAM.